US012609242B2

(12) United States Patent
Park et al.

(10) Patent No.: US 12,609,242 B2
(45) Date of Patent: Apr. 21, 2026

(54) MULTILAYERED CAPACITOR INCLUDING INTERNAL ELECTRODES HAVING LEAD PORTIONS

(71) Applicant: SAMSUNG ELECTRO-MECHANICS CO., LTD., Suwon-si (KR)

(72) Inventors: Byeonggyu Park, Suwon-si (KR); Yunsung Kang, Suwon-si (KR); Sun-Hwa Kim, Suwon-si (KR); Hyunsoo Park, Suwon-si (KR); Wonjun Na, Suwon-si (KR); Sungjoon Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 86 days.

(21) Appl. No.: 18/605,035

(22) Filed: Mar. 14, 2024

(65) Prior Publication Data

US 2025/0079081 A1      Mar. 6, 2025

(30) Foreign Application Priority Data

Sep. 1, 2023     (KR) ......................... 10-2023-0116380

(51) Int. Cl.
*H01G 4/012*          (2006.01)
*H01G 4/30*           (2006.01)

(52) U.S. Cl.
CPC .............. *H01G 4/012* (2013.01); *H01G 4/30* (2013.01)

(58) Field of Classification Search
None
See application file for complete search history.

(56) References Cited

U.S. PATENT DOCUMENTS

2013/0229749 A1*   9/2013   Lee ........................... H01G 4/30
                                                     156/89.12
2015/0014037 A1     1/2015   Ahn et al.

FOREIGN PATENT DOCUMENTS

CN          210467598 U   *   5/2020
JP          S5993123 U    *   6/1984
                 (Continued)

OTHER PUBLICATIONS

Translation JP 2014127581A (Year: 2014).*
                 (Continued)

*Primary Examiner* — Eric W Thomas
(74) *Attorney, Agent, or Firm* — Morgan, Lewis & Bockius LLP

(57)          ABSTRACT

A multilayered capacitor includes: a body including a first internal electrode and a second internal electrode disposed in a first direction while having a dielectric layer therebetween; and a first external electrode and a second external electrode respectively disposed at ends of the body in a second direction. The first internal electrode includes a first capacitance forming portion and a plurality of first lead portions extending from the first capacitance forming portion to connect to the first external electrode. The second internal electrode includes a second capacitance forming portion overlapping the first capacitance forming portion in the first direction and a plurality of second lead portions extending from the second capacitance forming portion to connect to the second external electrode. For a thickness in the first direction, one of the plurality of the first lead portion has a thickness smaller than a thickness of the first capacitance forming portion.

8 Claims, 11 Drawing Sheets

(56) References Cited

FOREIGN PATENT DOCUMENTS

| | | | | | |
|---|---|---|---|---|---|
| JP | H0897071 | A | * | 4/1996 | |
| JP | 2003-264118 | A | | 9/2003 | |
| JP | 2014-127581 | A | | 7/2014 | |
| KR | 20070103153 | A | * | 10/2007 | .............. H01G 4/12 |
| KR | 10-2015-0073917 | A | | 7/2015 | |

OTHER PUBLICATIONS

Translation JP 2003264118A (Year: 2003).*
Translation CN 210467598 U (no date).*
Translation KR 20070103153A (no date).*

* cited by examiner

MULTILAYERED CAPACITOR INCLUDING INTERNAL ELECTRODES HAVING LEAD PORTIONS

CROSS-REFERENCE TO RELATED APPLICATION

This application claims priority to and the benefit of Korean Patent Application No. 10-2023-0116380 filed in the Korean Intellectual Property Office on Sep. 1, 2023, the entire contents of which are incorporated herein by reference.

TECHNICAL FIELD

The present disclosure relates to a multilayered capacitor.

BACKGROUND

A multilayered capacitor refers to a chip-type condenser mounted on a printed circuit board of various electronic products such as image equipment, a computer, a smartphone, and a mobile phone to thus serve to charge or discharge electricity in the product.

The multilayered capacitor may be used as a component in various electronic devices due to its small size, high capacitance, and easy mounting feature. In recent years, there has been an increasing demand for the small size and high capacitance of the multilayered capacitor as the component in the electronic device becomes smaller.

An internal electrode of the multilayered capacitor is also required to have a small thickness as the capacitor has an ultra-small size and the high capacitance. In a case of internal electrodes manufactured by an existing screen printing method, the internal electrode may have a thickness that is less uniform, and may have difficulty in having the small thickness that is below a predetermined thickness due to a technical limitation. Therefore, there is a need for the development of internal electrodes by using a sputtering method.

SUMMARY

The present disclosure attempts to provide a multilayered capacitor which may lower a cutting stress of internal electrode, prevent an electrode breakage, improve poor contact of the internal electrode with an external electrode, and improve lower capacitance of the capacitor.

However, problems to be solved by embodiments of the present disclosure are not limited to the above-mentioned problems and may be variously expanded in a range of the spirit of the present disclosure included in the embodiments.

According to an embodiment, a multilayered capacitor includes: a capacitor body having first and second surfaces opposing each other in a first direction, third and fourth surfaces opposing each other in a second direction perpendicular to the first direction, and fifth and sixth surfaces opposing each other in a third direction perpendicular to the first and second directions, and including a plurality of dielectric layers and a first internal electrode and a second internal electrode alternately disposed in the first direction while having the dielectric layer interposed therebetween; and a first external electrode and a second external electrode respectively disposed at both ends of the capacitor body in the second direction. The first internal electrode includes a first capacitance forming portion and a plurality of first lead portions extending from the first capacitance forming portion to the third surface of the capacitor body and connected to the first external electrode. The second internal electrode includes a second capacitance forming portion overlapping the first capacitance forming portion in the first direction and a plurality of second lead portions extending from the second capacitance forming portion to the fourth surface of the capacitor body and connected to the second external electrode. For a thickness in the first direction, one of the plurality of the first lead portions has a thickness smaller than a thickness of the first capacitance forming portion, and one of the plurality of the second lead portions has a thickness smaller than a thickness of the second capacitance forming portion.

For a width in the third direction, the one of the plurality of first lead portions may have a width smaller toward the third surface of the capacitor body, and the one of the plurality of second lead portions may have a width smaller toward the fourth surface of the capacitor body.

The thickness of the one of the plurality of first lead portions may be smaller toward one end of the capacitor body, and the thickness of the one of the plurality of second lead portions may be smaller toward the other end of the capacitor body.

The one of the plurality of first lead portions and the one of the plurality of second lead portions may have an upper surface in the first direction of a height gradually lower in the first direction.

The one of the plurality of first lead portions and the one of the plurality of second lead portions each may have an upper surface inclined with respect to the first surface which is more than a lower surface thereof.

The first and second internal electrode may be a sputtering layer.

The first internal electrode may further include a third lead portion extending from the first capacitance forming portion to the fifth surface of the capacitor body and connected to the first external electrode, and a fourth lead portion extending from the first capacitance forming portion to the sixth surface of the capacitor body and connected to the first external electrode.

A width of a portion of the third lead portion being connected to the first external electrode may be greater than a width a portion of the one of the plurality of the first lead portions being connected to the first external electrode, and a width of a portion of the fourth lead portion being connected to the first external electrode may be greater than the width a portion of the one of the plurality of the first lead portions being connected to the first external electrode.

The second internal electrode may further include a fifth lead portion extending from the second capacitance forming portion to the fifth surface of the capacitor body and connected to the second external electrode, and a sixth lead portion extending from the second capacitance forming portion to the sixth surface of the capacitor body and connected to the second external electrode.

For a width in the third direction, a sum of widths of respective portions of the plurality of first lead portions in contact with the third surface of the capacitor body may be smaller than a width of the first capacitance forming portion, and a sum of widths of respective portions of the plurality of second lead portions in contact with the fourth surface of the capacitor body may be smaller than a width of the second capacitance forming portion.

The plurality of the first lead portions and the plurality of the second lead portions may respectively include two first lead portions and two the second lead portions.

The plurality of the first lead portions and the plurality of the second lead portions may respectively include four first lead portions and four the second lead portions.

According to another embodiment, a multilayered capacitor includes: a capacitor body having first and second surfaces opposing each other in a first direction, third and fourth surfaces opposing each other in a second direction perpendicular to the first direction, and fifth and sixth surfaces opposing each other in a third direction perpendicular to the first and second directions, and including a plurality of dielectric layers and a first internal electrode and a second internal electrode alternately disposed in the first direction while having the dielectric layer interposed therebetween; and a first external electrode and a second external electrode respectively disposed at both ends of the capacitor body in the second direction. The first internal electrode includes a first capacitance forming portion and a plurality of first lead portions extending from the first capacitance forming portion to the third surface of the capacitor body and connected to the first external electrode. The second internal electrode includes a second capacitance forming portion overlapping the first capacitance forming portion in the first direction and a plurality of second lead portions extending from the second capacitance forming portion to the fourth surface of the capacitor body and connected to the second external electrode. For a width in the third direction, one of the plurality of first lead portions has a width smaller toward the first external electrode, and one of the plurality of second lead portions has a width smaller toward the second external electrode.

The first or second internal electrode may include a sputtering layer.

The first internal electrode may further include a third lead portion extending from the first capacitance forming portion to the fifth surface of the capacitor body and connected to the first external electrode, and a fourth lead portion extending from the first capacitance forming portion to the sixth surface of the capacitor body and connected to the first external electrode.

A width of a portion of the third lead portion being connected to the first external electrode may be greater than a width a portion of the one of the plurality of the first lead portions being connected to the first external electrode, and a width of a portion of the fourth lead portion being connected to the first external electrode may be greater than the width a portion of the one of the plurality of the first lead portions being connected to the first external electrode.

The second internal electrode may further include a fifth lead portion extending from the second capacitance forming portion to the fifth surface of the capacitor body and connected to the second external electrode, and a sixth lead portion extending from the second capacitance forming portion to the sixth surface of the capacitor body and connected to the second external electrode.

For a width in the third direction, a sum of widths of respective portions of the plurality of first lead portions in contact with the third surface of the capacitor body may be smaller than a width of the first capacitance forming portion, and a sum of widths of respective portions of the plurality of second lead portions in contact with the fourth surface of the capacitor body may be smaller than a width of the second capacitance forming portion.

The plurality of the first lead portions and the plurality of the second lead portions may respectively include two first lead portions and two the second lead portions.

The plurality of the first lead portions and the plurality of the second lead portions may respectively include four first lead portions and four the second lead portions.

As set forth above, the multilayered capacitor according to the embodiments may lower the cutting stress of the internal electrode, prevent the electrode breakage, improve the poor contact of the internal electrode with the external electrode, and improve the lower capacitance of the capacitor.

The multilayered capacitor according to the embodiments may reduce the area of the connection portion between the internal electrode and the external electrode, and improve the defect occurring due to the plating solution penetration, thereby improving the product reliability.

The multilayered capacitor according to the embodiments may increase connectivity between the internal electrode and the external electrode, and distribute the cutting stress of the internal electrode.

DETAILED DESCRIPTION OF THE EMBODIMENTS

Figure 1:
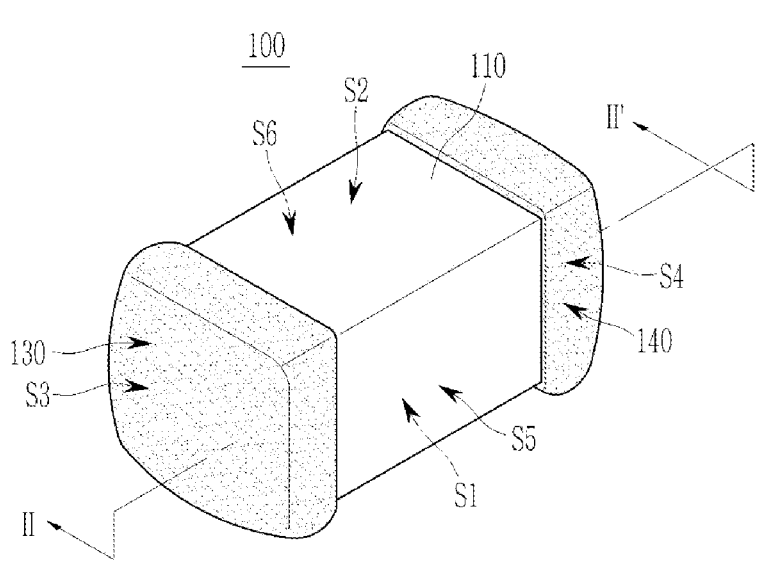
FIG. 1 is a perspective view schematically showing a multilayered capacitor according to an embodiment of the present disclosure.
Figure 1:
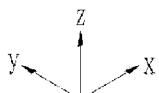

Hereinafter, embodiments of the present disclosure will be described in detail with reference to the accompanying drawings for those skilled in the art to which the present disclosure pertains to easily practice the present disclosure. A portion unrelated to the description is omitted in order to obviously describe the present disclosure, and the same or similar components are denoted by the same reference numeral throughout the specification. In addition, it is to be noted that some components shown in the accompanying drawings are exaggerated, omitted or schematically illustrated, and the size of each component does not exactly reflect its real size.

It should be understood that the accompanying drawings are provided only to allow the embodiments of the present disclosure to be easily understood, and the spirit of the present disclosure is not limited by the accompanying drawings, and includes all the modifications, equivalents, and substitutions included in the spirit and scope of the present disclosure.

Terms including ordinal numbers such as "first," "second," and the like may be used to describe various components. However, these components are not limited by these terms. The terms are used only to distinguish one component from another component.

In addition, when an element such as a layer, a film, a region or a board is referred to as being "on" or "above" another element, the element may be "directly on" another element or may have a third element interposed therebetween. On the contrary, when an element is referred to as being "directly on" another element, there is no third element interposed therebetween. In addition, when an element is referred to as being "on" or "above" a reference element, the element may be disposed on or below the reference element, and may not necessarily be "on" or "above" the reference element in an opposite direction of gravity.

It should be understood that terms "include" and "comprise" used in this specification specify the presence of features, numerals, steps, operations, components, parts mentioned in this specification, or combinations thereof, and do not preclude the presence or addition of one or more other features, numerals, steps, operations, components, parts, or combinations thereof. Unless explicitly described to the contrary, "including" any component will be understood to imply the inclusion of other components rather than the exclusion of other components.

Further, throughout the specification, an expression "on the plane" may indicate a case where a target is viewed from the top, and an expression "on the cross section" may indicate a case where a cross section of a target taken along a vertical direction is viewed from its side.

Throughout the specification, when an element is referred to as being "coupled to" another element, it may not only indicate that the element and another element are "directly or physically coupled to" each other, but also indicate that the element and another element are "indirectly or contactlessly coupled to" each other while having a third element interposed therebetween.

In addition, when it is mentioned that any component is "connected" to another component, it may not only indicate that two or more components are directly connected with each other, but also indicate that two or more components are connected with each other indirectly through another component, may not only indicate that two or more components are physically connected with each other, but also indicate that two or more components are electrically connected, or two or more components are a single entity although referred to by different names depending on their locations or functions.

Hereinafter, in order to clearly describe the embodiments of the present disclosure, directions of a capacitor body 110 may be defined as follows: x, y, and z axis directions shown in the drawings may respectively represent the length direction, width direction, and thickness direction of the capacitor body 110. Here, the z axis direction (or a thickness direction) may be a direction perpendicular to a wide surface (or main surface) of a sheet-shaped component, and may be used as the same concept as that of a stacking direction in which dielectric layers 111 are stacked, for example. The x axis direction (or a length direction) may be a direction extending to be parallel to the wide surface (or main surface) of the sheet-shaped component, and approximately perpendicular to the z axis direction (or a thickness direction). For example, the x axis direction may be a direction in which first and second external electrodes 130 and 140 are disposed on both sides of the component. The y axis direction (or the width direction) may be a direction extending to be parallel to the wide surface (or main surface) of the sheet-shaped component, and approximately perpendicular to the z axis direction (or the thickness direction), and the x axis direction (or the length direction). A length of the sheet-shaped component in the x axis direction (or the length direction) may be greater than its width in the y axis direction (or the width direction).

Accordingly, a first direction in which the dielectric layer 111 and first and second internal electrodes 121 and 122 are stacked may be the z axis direction (or the thickness direction), and second and third directions each perpendicular to the first direction and perpendicular to each other may respectively be the x axis direction (or the length direction) and the y axis direction (or the width direction).

FIG. 1 is a perspective view schematically showing a multilayered capacitor according to an embodiment of the present disclosure.

Figure 2:
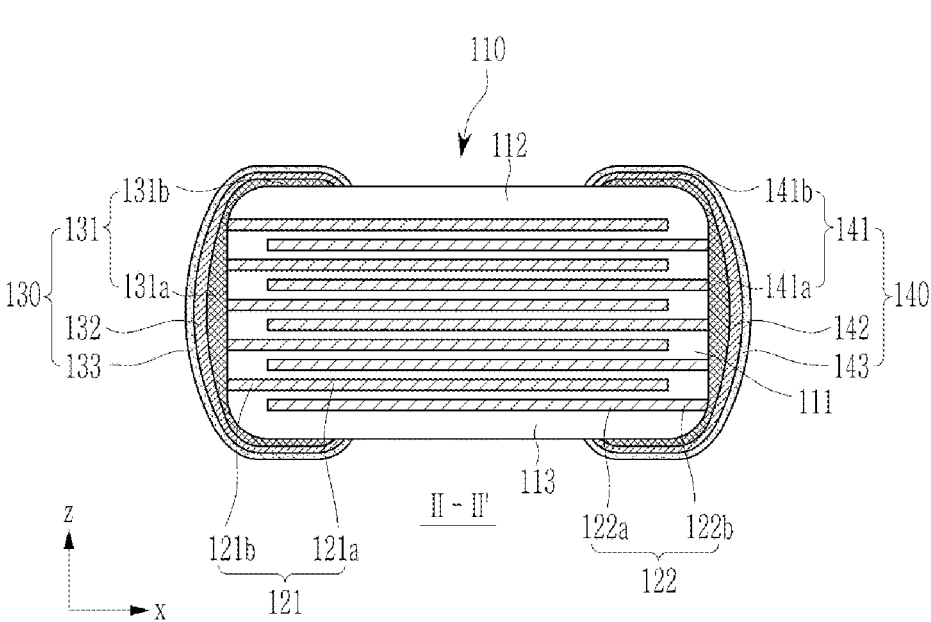
FIG. 2 is a cross-sectional view taken along line II-II' of FIG. 1.

FIG. 2 is a cross-sectional view taken along line II-II' of FIG. 1. FIG. 2 is a view showing an x-z cross section passing through a point where first lead portion 121b and the first external electrode 130 are in contact with each other and a point where second lead portion 122b and the second external electrode 140 are in contact with each other.

Referring to FIGS. 1 and 2, a multilayered capacitor 100 according to this embodiment may include the capacitor body 110 and the first and second external electrodes 130 and 140.

The capacitor body 110 may include the plurality of dielectric layers 111 and the plurality of first internal electrodes 121 and the second internal electrodes 122 alternately disposed in the z axis direction while having the dielectric layers 111 interposed therebetween.

The capacitor body 110 may be made by stacking the plurality of dielectric layers 111 in the z axis direction and then sintering the same. Boundaries between the adjacent dielectric layers 111 of the capacitor body 110 may be integrated with each other, and the boundaries therebetween are not readily apparent without using a scanning electron microscope (SEM).

The capacitor body 110 may have an approximately hexahedral shape while having a thickness of a predetermined size in the z axis direction, a length of a predetermined size in the x axis direction, and a width of a predetermined size in the y axis direction. However, the shape and dimensions of the capacitor body 110 and the number of stacks of the dielectric layer 111 are not limited to those shown in the drawings of this embodiment.

In this embodiment, for convenience of description, first and second surfaces S1 and S2 of the capacitor body 110 refer to opposite surfaces of the capacitor body 110 opposing each other in the z axis direction, third and fourth surfaces S3 and S4 of the capacitor body 110 refer to opposite surfaces of the capacitor body 110 connected to the first and second surfaces 1 and 2 and opposing each other in the x axis direction, and fifth and sixth surfaces S5 and S6 of the capacitor body 110 refer to opposite surfaces of the capacitor body 110 connected to the first and second surfaces S1 and S2, connected to the third and fourth surfaces S3 and S4, and opposing each other in the y axis direction.

In addition, in this embodiment, a mounting surface of the multilayered capacitor 100 may be the first surface S1 of the capacitor body 110.

The dielectric layer 111 may include a ceramic material having a high dielectric constant, such as barium titanate ($BaTiO_3$)-based ceramic powders or strontium titanate (Sr-$TiO_3$)-based ceramic powders. However, a material of the dielectric layer 111 is not limited thereto as long as sufficient capacitance may be obtained.

In addition, the dielectric layer 111 may further include a ceramic additive, an organic solvent, a plasticizer, a binder, a dispersant, or the like, in addition to the ceramic powders.

The ceramic additive may include, for example, a transition metal oxide or a transition metal carbide, a rare earth element, magnesium (Mg), or aluminum (Al).

The capacitor body 110 may include an active region, which contributes to forming capacitance of the capacitor, and upper and lower covers 112 and 113 respectively formed on upper and lower surfaces of the active region in the z axis direction as upper and lower margin parts.

The upper and lower covers 112 and 113 may have the same material configuration as those of the dielectric layers 111 except that the cover includes no internal electrode.

The upper and lower covers 112 and 113 may be formed by stacking a single dielectric layer or two or more dielectric layers respectively on the upper and lower surfaces of the active region in the z axis direction, and may basically serve to prevent damage to the first and second internal electrodes 121 and 122 due to physical or chemical stress.

The first and second internal electrodes 121 and 122, which are electrodes having different polarities, may be alternately disposed in the z axis direction while having the dielectric layer 111 interposed therebetween, and one end of the first or second internal electrode 121 or 122 may be exposed through the third or fourth surface S3 and S4 of the capacitor body 110.

The first and second internal electrodes 121 and 122 may respectively include the plurality of first and second electrodes 121 and 122.

The first and second internal electrodes 121 and 122 may be electrically insulated from each other by the dielectric layer 111 disposed between the first and second internal electrodes 121 and 122.

The ends of the first and second internal electrodes 121 and 122, which are alternately exposed through the third and fourth surfaces S3 and S4 of the capacitor body 110, may respectively be connected to and electrically connected to the first and second external electrodes 130 and 140 described below, which are disposed on the third and fourth surfaces S3 and S4 of the capacitor body 110.

Therefore, it is possible to improve an adhesion between the internal electrode and the external electrode, lower poor contact therebetween, and prevent lower capacitance of the multilayered capacitor 100.

In addition, the first or second internal electrode 121 or 122 is not limited to any particular material.

The first or second internal electrode 121 or 122 may be a sputtering layer.

That is, the first or second internal electrode 121 or 122 may be the sputtering layer formed by a sputtering method.

The first or second internal electrode 121 or 122 may be formed by the sputtering method, thereby forming a pattern more precisely than when using a conductive paste.

The first internal electrode 121 may include a first capacitance forming portion 121a and the plurality of first lead portions 121b.

The first capacitance forming portion 121a may be spaced apart from the third to sixth surfaces S3, S4, S5, and S6 of the capacitor body 110, and contribute to forming the capacitance of the capacitor.

The first lead portion 121b may extend from the first capacitance forming portion 121a to be exposed to the third surface S3 of the capacitor body 110 and connected to the first external electrode 130.

The second internal electrode 122 may include a second capacitance forming portion 122a and the plurality of second lead portions 122b.

The second capacitance forming portion 122a may be spaced apart from the third to sixth surfaces S3, S4, S5, and S6 of the capacitor body 110, overlap the first capacitance forming portion 121a in the z axis direction, and contribute to forming the capacitance of the capacitor.

The second lead portion 122b may extend from the second capacitance forming portion 122a to be exposed to the fourth surface S4 of the capacitor body 110, and may be connected to the second external electrode 140.

The first and second lead portions 121b and 122b may be disposed to be offset from each other in the length direction of the capacitor body 110, and alternately exposed at both ends of the capacitor body 110 in the length direction.

Through the above configuration, charges may be accumulated between the first and second internal electrodes 121 and 122 when a predetermined voltage is applied to the first and second external electrodes 130 and 140.

Here, the capacitance of the multilayered capacitor 100 may be proportional to an area in which the first capacitance forming portion 121a of the first internal electrode 121 and the second capacitance forming portion 122a of the second internal electrode 122 overlap each other in the active region of the capacitor body 110 in the z axis direction.

The first and second external electrodes 130 and 140 may be provided with the voltages of different polarities, disposed at both the ends of the capacitor body 110 in the x axis direction, and respectively connected to and electrically connected to the exposed portions of the first and second internal electrodes 121 and 122.

For example, the first external electrode 130 may be connected to and electrically connected to the plurality of first lead portions 121b, and the second external electrode 140 may be connected to and electrically connected to the second lead portions 122b described below.

The first external electrode 130 may include a first conductive layer 131 disposed on the surface of the capacitor body 110 and connected to the first internal electrode 121, a first inner plating layer 132 disposed to cover the first conductive layer 131, and a first outer plating layer 133 disposed to cover the first inner plating layer 132.

In addition, the second external electrode 140 may include a second conductive layer 141 disposed on the surface of the capacitor body 110 and connected to the second internal electrode 122, a second inner plating layer 142 disposed to cover the second conductive layer 141, and a second outer plating layer 143 disposed to cover the second inner plating layer 142.

The first conductive layer 131 may include a first connection portion 131a and a first band portion 131b.

The first connection portion 131a may be disposed on the third surface S3 of the capacitor body 110, and connected to the exposed portion of the first internal electrode 121.

In detail, the first connection portion 131a may be connected to the plurality of first lead portions 121b exposed from the third surface S3 of the capacitor body 110.

The first band portion 131b may extend from the first connection portion 131a to a portion of the first surface S1 of the capacitor body 110.

Here, the first band portion 131b may further extend to portions of the fifth and sixth surfaces S5, S6 of the capacitor body 110 and a portion of the second surface S2 to have an improved adhesion strength.

The second conductive layer 141 may include a second connection portion 141a and a second band portion 141b.

The second connection portion 141a may be disposed on the fourth surface S4 of the capacitor body 110, and connected to the exposed portion of the second internal electrode 122.

In detail, the second connection portion 141a may be connected to the plurality of second lead portions 122b exposed from the fourth surface S4 of the capacitor body 110.

The second band portion 141b may extend from the second connection portion 141a to a portion of the first surface S1 of the capacitor body 110.

Here, the second band portion 141b may further extend to portions of the fifth and sixth surfaces S5, S6 of the capacitor body 110 and a portion of the second surface S2 to have an improved adhesion strength.

The first or second conductive layer 131 or 141 may include at least one of copper (Cu) and silver (Ag), and may further include glass and epoxy in addition thereto.

The first or second conductive layer 131 or 141 may be formed by applying the conductive paste including a metal and firing the same.

The first or second inner plating layer 132 or 142 may include nickel (Ni) or phosphorus (P).

In addition, the first or second inner plating layer 132 or 142 may be formed by plating a first metal layer including nickel and phosphorus on the first or second conductive layer 131 or 141.

The first and second inner plating layers 132 and 142 may each be formed by electroless plating.

When formed by the electroless plating in this way, the first or second inner plating layer 132 or 142 may have superior corrosion resistance than a film formed by electrolytic plating, while having a plating property not significantly different from that of the electrolytic plating, and may have a uniform plating thickness formed as the plating grows approximately equally for each position.

In addition, the electroless plating may allow plating of only an object to be plated without a dummy, making it easier to prepare for the plating and select a defect in the object to be plated after the plating.

The first or second outer plating layer 133 or 143 may include palladium (Pd) or phosphorus (P).

In addition, the first or second outer plating layer 133 or 143 may be formed by plating a second metal layer including palladium and phosphorus on the first or second inner plating layer 132 or 142 by using the electroless plating.

The first or second outer plating layer 133 or 143 may serve to prevent the nickel component of the first or second inner plating layer 132 or 142 from oxidation, and may thus have a smaller thickness by using a material including a noble metal with little oxidation.

When the first or second outer plating layer 133 or 143 has an increased thickness, the plating layer may have an increased breakage possibility.

When formed by the electroless plating in this way, the first or second outer plating layer 133 or 143 may have superior corrosion resistance than the film formed by the electrolytic plating, while having the plating property not significantly different from that of the electrolytic plating, and may have a uniform plating thickness formed as the plating grows approximately equally for each position.

Hereinafter, the description describes a structure of the first or second internal electrode 121 or 122 in detail with reference to FIGS. 3A to 8.

Figure 3A:
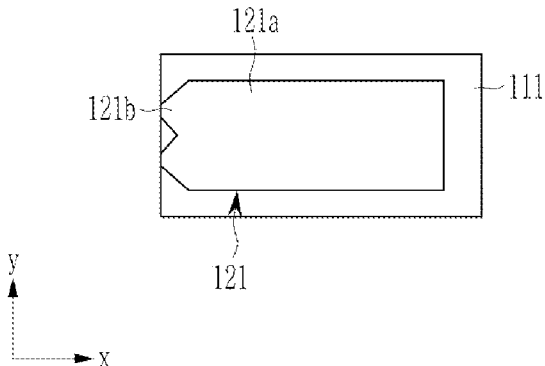
FIGS. 3A and 3B are plan views respectively showing first and second internal electrodes applied to the multilayered capacitor of FIG. 1 according to an embodiment.
Figure 3B:
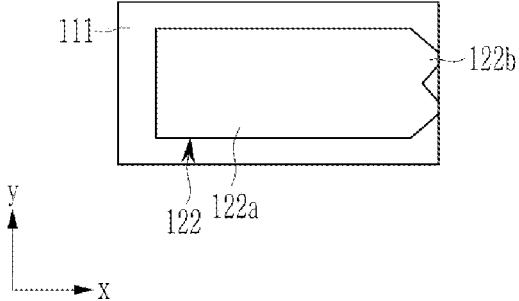

FIGS. 3A and 3B are plan views respectively showing the first and second internal electrodes applied to the multilayered capacitor of FIG. 1 according to an embodiment, FIGS.

Figure 5A:
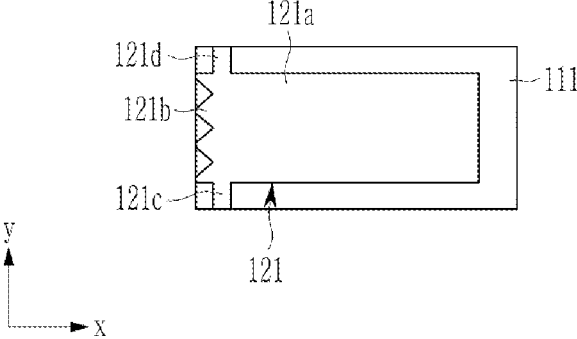
FIGS. 5A and 5B are plan views respectively showing first and second internal electrodes according to another embodiment.
Figure 5B:
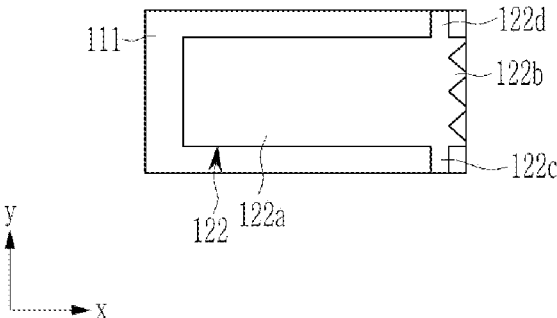

4A and 4B are plan views respectively showing the first and second internal electrodes in a modified example, and FIGS. 5A and 5B are plan views respectively showing first and second internal electrodes according to another embodiment.

Referring to FIG. 3A, the plurality of first lead portions 121b may be disposed at one end of the first capacitance forming portion 121a.

For example, the two first lead portions 121b may be disposed at one end of the first capacitance forming portion 121a, and the present disclosure is not limited thereto.

A width of the first lead portion 121b in the y axis direction may be smaller than a width of the first capacitance forming portion 121a in the y axis direction.

A width of the first or second internal electrode 121 or 122 may have the maximum value, the minimum value, or an arithmetic average of lengths of a plurality of line segments among the lengths of the plurality of line segments connected from a point on the rear surface of the first or second internal electrode 121 or 122 to the front surface thereof in the y axis direction based on an x-y cross section passing through a point where the first or second internal electrode 121 or 122 and the first or second external electrode 130 or 140 are in contact with each other.

The width of the first or second internal electrode 121 or 122 may be measured using an optical microscope, a scanning electron microscope, or the like.

In addition, the sum of the respective widths of the plurality of the first lead portions 121b in the y axis direction may be smaller than the width of the first capacitance forming portion 121a in the y axis direction.

Each of the plurality of first lead portions 121b in the y axis direction may have a width gradually smaller toward the first external electrode 130.

Each of the plurality of first lead portions 121b in the y axis direction may have a width gradually smaller toward the third surface S3 of the capacitor body 110.

Therefore, the sum of the widths of respective portions of the plurality of the first lead portions 121b in contact with the third surface S3 of the capacitor body 110 in the y axis direction may be smaller than the width of the first capacitance forming portion 121a in the y axis direction.

Referring to FIG. 3B, the plurality of second lead portions 122b may be disposed at one end of the second capacitance forming portion 122a.

For example, the two second lead portions 122b may be disposed at one end of the second capacitance forming portion 122a.

A width of the second lead portion 122b in the y axis direction may be smaller than a width of the second capacitance forming portion 122a in the y axis direction.

In addition, the sum of the respective widths of the plurality of the second lead portions 122b in the y axis direction may be smaller than the width of the second capacitance forming portion 122a in the y axis direction.

Each of the plurality of second lead portions 122b in the y axis direction may have a width gradually smaller toward the second external electrode 140.

Each of the plurality of second lead portions 122b in the y axis direction may have a width gradually smaller toward the fourth surface S4 of the capacitor body 110.

Therefore, the sum of the widths of respective portions of the plurality of second lead portions 122b in contact with the fourth surface S4 of the capacitor body 110 in the y axis direction may be smaller than the width of the second capacitance forming portion 122a in the y axis direction.

As described above, in a process of manufacturing the multilayered capacitor, the width of the portion where the first or second lead portion 121b or 122b, which corresponds to a cutting region, is in contact with the capacitor body 110 may be formed to be smaller than the width of the first or second capacitance forming portion 121a or 122a, thereby lowering a cutting stress, preventing the electrode breakage, improving the poor contact of the internal electrode with the external electrode, and improving the lower capacitance of the capacitor.

In addition, the widths of the plurality of the first lead portions 121b or the plurality of the second lead portions 122b in the y axis direction may each be gradually smaller toward the first or second external electrode 130 or 140 to thus reduce an area of the connection portion between the internal electrode and the external electrode, and improve the defect occurring due to plating solution penetration, thereby improving product reliability, and easily controlling the shape of the internal electrode.

Figure 4A:
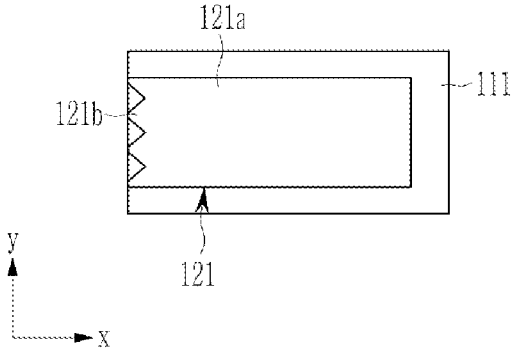
FIGS. 4A and 4B are plan views respectively showing the first and second internal electrodes in a modified example.

Referring to FIG. 4A, the plurality of first lead portions 121b may be disposed at one end of the first capacitance forming portion 121a.

For example, the four first lead portions 121b may be disposed at one end of the first capacitance forming portion 121a, and the present disclosure is not limited thereto.

The width of the first lead portion 121b in the y axis direction may be smaller than the width of the first capacitance forming portion 121a in the y axis direction.

In addition, the sum of the respective widths of the plurality of the first lead portions 121b in the y axis direction may be smaller than the width of the first capacitance forming portion 121a in the y axis direction.

Each width of the plurality of first lead portions 121b in the y axis direction may be gradually smaller toward the first external electrode 130.

Each width of the plurality of first lead portions 121b in the y axis direction may be gradually smaller toward the third surface S3 of the capacitor body 110.

Therefore, the sum of the widths of respective portions of the plurality of the first lead portions 121b in contact with the third surface S3 of the capacitor body 110 in the y axis direction may be smaller than the width of the first capacitance forming portion 121a in the y axis direction.

Each of the plurality of first lead portions 121b may have a triangular cross-sectional shape.

Figure 4B:
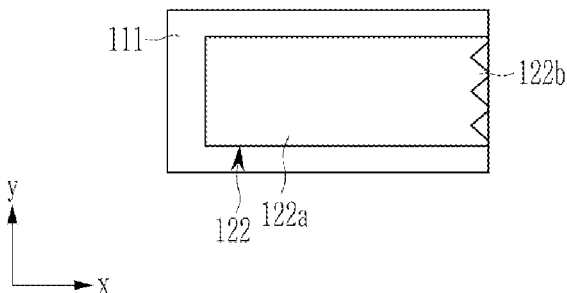

Referring to FIG. 4B, the plurality of second lead portions 122b may be disposed at one end of the second capacitance forming portion 122a.

For example, the four second lead portions 122b may be disposed at one end of the second capacitance forming portion 122a.

The width of the second lead portion 122b in the y axis direction may be smaller than the width of the second capacitance forming portion 122a in the y axis direction.

In addition, the sum of the respective widths of the plurality of the second lead portions 122b in the y axis direction may be smaller than the width of the second capacitance forming portion 122a in the y axis direction.

Each width of the plurality of second lead portions 122b in the y axis direction may be gradually smaller toward the second external electrode 140.

Each width of the plurality of second lead portions 122b in the y axis direction may be gradually smaller toward the fourth surface S4 of the capacitor body 110.

Therefore, the sum of the widths of respective portions of the plurality of the second lead portions 122b in contact with the fourth surface S4 of the capacitor body 110 in the y axis direction may be smaller than the width of the second capacitance forming portion 122a in the y axis direction.

Each of the plurality of second lead portions 122b may have a triangular cross-sectional shape.

In this modified example, the first and second lead portions 121b and 122b may have a smaller width in the y axis direction, and may be more numerous than those in FIG. 3.

It is thus possible to improve connectivity between the first or second lead portion 121b or 122b and the first or second external electrode 130 or 140.

As described above, in the process of manufacturing the multilayered capacitor, the width of the portion where the first or second lead portion 121b or 122b, which corresponds to a cutting region, is in contact with the capacitor body 110 may be formed to be smaller than the width of the first or second capacitance forming portion 121a or 122a, thereby lowering the cutting stress, preventing the electrode breakage, improving the poor contact of the internal electrode with the external electrode, and improving the lower capacitance of the capacitor.

In addition, the widths of the plurality of the first lead portions 121b or the plurality of the second lead portions 122b in the y axis direction may each be gradually smaller toward the first or second external electrode 130 or 140 to thus reduce the area of the connection portion between the internal electrode and the external electrode, and improve the defect occurring due to the plating solution penetration, thereby improving the product reliability.

Referring to FIG. 5A, the first internal electrode 121 according to another embodiment may include the first capacitance forming portion 121a, the plurality of first lead portions 121b, and a third lead portion 121c, and a fourth lead portion 121d.

The plurality of first lead portions 121b may be disposed at one end of the first capacitance forming portion 121a For example, the four first lead portions 121b may be disposed at one end of the first capacitance forming portion 121a, and the present disclosure is not limited thereto.

A width of the first lead portion 121b in the y axis direction may be smaller than a width of the first capacitance forming portion 121a in the y axis direction.

In addition, the sum of the respective widths of the plurality of the first lead portions 121b in the y axis direction may be smaller than the width of the first capacitance forming portion 121a in the y axis direction.

Each width of the plurality of first lead portions 121b in the y axis direction may be gradually smaller toward the first external electrode 130.

Each width of the plurality of first lead portions 121b in the y axis direction may be gradually smaller toward the third surface S3 of the capacitor body 110.

Therefore, the sum of the widths of respective portions of the plurality of the first lead portions 121b in contact with the third surface S3 of the capacitor body 110 in the y axis direction may be smaller than the width of the first capacitance forming portion 121a in the y axis direction.

Each of the plurality of first lead portions 121b may have a triangular cross-sectional shape.

In addition, the third lead portion 121c may extend from the first capacitance forming portion 121a to the fifth surface S5 of the capacitor body 110 and may be connected to the first external electrode 130.

The fourth lead portion 121d may extend from the first capacitance forming portion 121a to the sixth surface S6 of the capacitor body 110 and may be connected to the first external electrode 130.

Referring to FIG. 5B, the first internal electrode 122 according to another embodiment may include the second capacitance forming portion 122a, the plurality of second lead portions 122b, a fifth lead portion 122c, and a sixth lead portion 122d.

The plurality of second lead portions 122b may be disposed at one end of the second capacitance forming portion 122a. For example, the four second lead portions 122b may be disposed at one end of the second capacitance forming portion 122a, and the present disclosure is not limited thereto.

A width of the second lead portion 122b in the y axis direction may be smaller than a width of the second capacitance forming portion 122a in the y axis direction.

In addition, the sum of the respective widths of the plurality of the second lead portions 122b in the y axis direction may be smaller than the width of the second capacitance forming portion 122a in the y axis direction.

Each width of the plurality of second lead portions 122b in the y axis direction may be gradually smaller toward the second external electrode 140.

Each width of the plurality of second lead portions 122b in the y axis direction may be gradually smaller toward the fourth surface S4 of the capacitor body 110.

Therefore, the sum of the widths of respective portions of the plurality of the second lead portions 122b in contact with the fourth surface S4 of the capacitor body 110 in the y axis direction may be smaller than the width of the second capacitance forming portion 122a in the y axis direction.

Each of the plurality of second lead portions 122b may have a triangular cross-sectional shape.

In addition, the fifth lead portion 122c may extend from the second capacitance forming portion 122a to the fifth surface S5 of the capacitor body 110 and may be connected to the second external electrode 140.

The sixth lead portion 122d may extend from the second capacitance forming portion 122a to the sixth surface S6 of the capacitor body 110 and may be connected to the second external electrode 140.

The first and second internal electrodes 121 and 122 in this embodiment may further include the third to sixth lead portions 121c, 121d, 122c, and 122d compared to those in FIGS. 4A and 4B.

It is thus possible to increase connectivity between the first or second internal electrode 121 or 122 and the first or second external electrode 130 or 140, and distribute a cutting stress of the first or second internal electrode 121 or 122.

As described above, in the process of manufacturing the multilayered capacitor, the width of the portion where the first or second lead portion 121b or 122b, which corresponds to a cutting region, is in contact with the capacitor body 110 may be formed to be smaller than the width of the first or second capacitance forming portion 121a or 122a, thereby lowering the cutting stress, preventing the electrode breakage, improving the poor contact of the internal electrode with the external electrode, and improving the lower capacitance.

In addition, the widths of the plurality of the first lead portions 121b or the plurality of the second lead portions 122b in the y axis direction may each be gradually smaller toward the first or second external electrode 130 or 140 to thus reduce the area of the connection portion between the internal electrode and the external electrode, and improve the defect occurring due to the plating solution penetration, thereby improving the product reliability.

Figure 6:
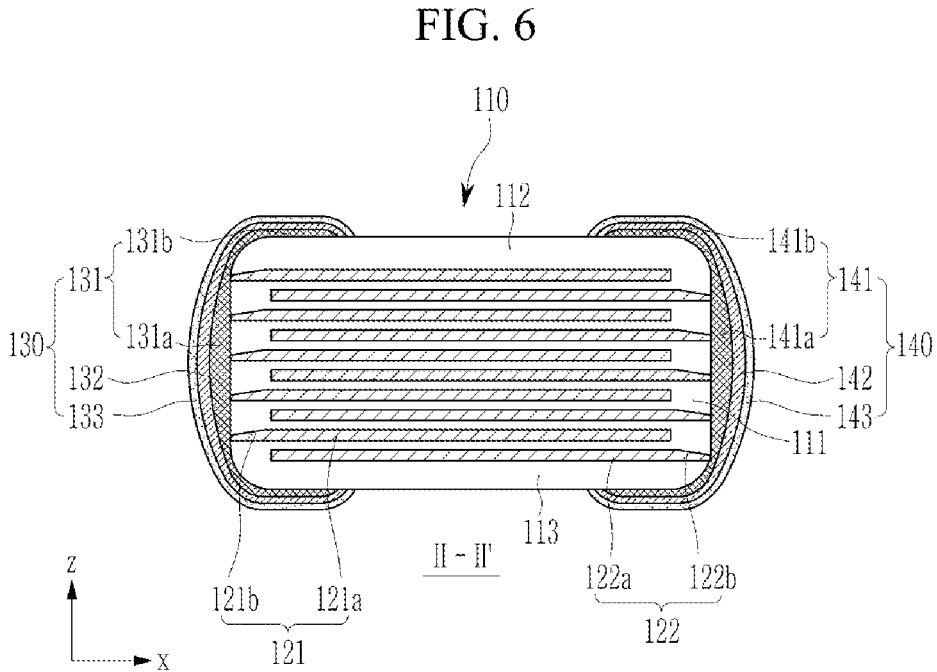
FIG. 6 is a cross-sectional view taken along line II-II' of FIG. 1 to show first and second internal electrodes according to still another embodiment.
Figure 7:
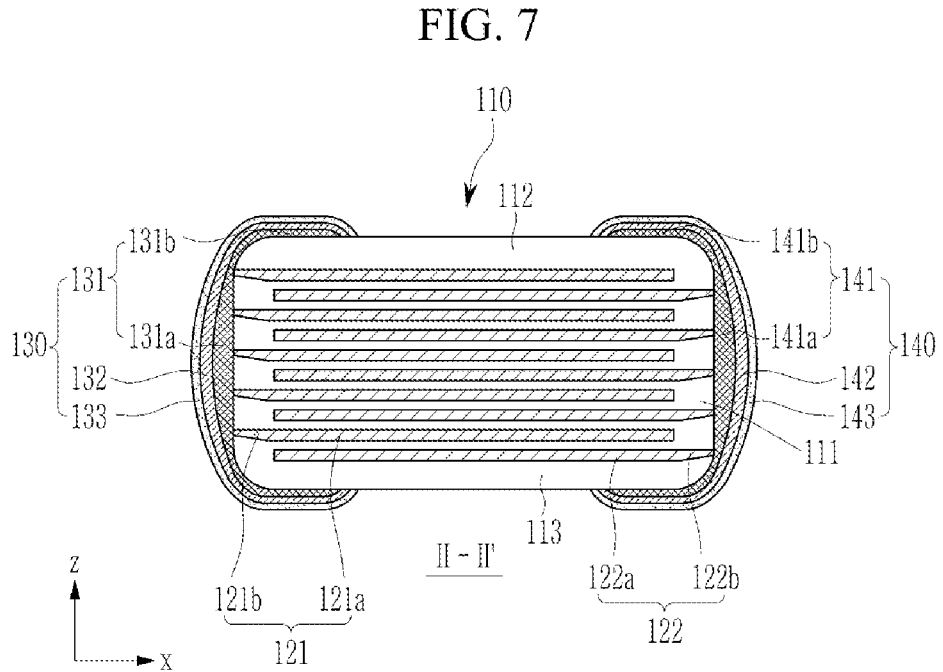
FIG. 7 is a cross-sectional view showing the first and second internal electrodes in a modified example.
Figure 8:
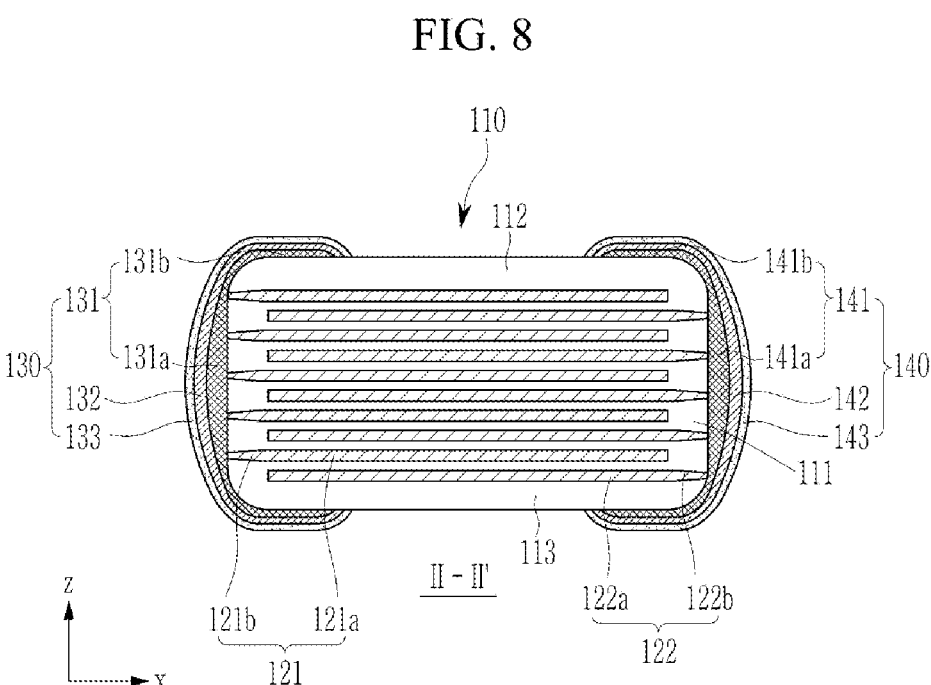
FIG. 8 is a cross-sectional view showing first and second internal electrodes in a modified example.

FIG. 6 is a cross-sectional view taken along line II-II' of FIG. 1 to show first and second internal electrodes according to still another embodiment; and FIGS. 7 and 8 are cross-sectional views each showing the first and second internal electrodes in a modified example.

Referring to FIG. 6, each thickness of the plurality of first lead portions 121b in the z axis direction may be smaller than a thickness of the first capacitance forming portion 121a.

In addition, each thickness of the plurality of second lead portions 122b in the z axis direction may be smaller than a thickness of the second capacitance forming portion 122a.

A thickness of the first or second internal electrode 121 or 122 may have the maximum value, the minimum value, or an arithmetic average of lengths of a plurality of line segments among the lengths of the plurality of line segments connected from a point on an upper surface of the first or second internal electrode 121 or 122 to a lower surface thereof in the z axis direction based on the x-z cross section passing through a point where the first or second internal electrode 121 or 122 and the first or second external electrode 130 or 140 are in contact with each other.

The thickness of the first or second internal electrode 121 or 122 may be measured using the optical microscope, the scanning electron microscope, or the like.

Each thickness of the plurality of first lead portions 121b in the z axis direction may be smaller toward one end of the capacitor body 110, and each thickness of the plurality of second lead portions 122b in the z axis direction may be smaller toward the other end of the capacitor body 110.

In detail, each thickness of the plurality of first lead portions 121b in the z axis direction may be gradually smaller toward the third surface S3 of the capacitor body 110 in the x axis direction.

In addition, each thickness of the plurality of second lead portions 121b in the z axis direction may be gradually smaller toward the fourth surface S4 of the capacitor body 110 in the x axis direction.

Each of the plurality of first lead portions 121b or each of the plurality of second lead portions 122b may have an upper surface in the z axis direction of a height gradually lower in the z axis direction.

However, the present disclosure is not limited thereto, and each of the plurality of the first lead portions 121b or each of the plurality of the second lead portions 122b may have any shape as long as its thickness is smaller in the z axis direction.

For example, referring to FIG. 7, each of the plurality of first lead portions 121b or each of the plurality of second lead portions 122b may have a lower surface in the z axis direction of a height gradually higher in the z axis direction.

For another example, referring to FIG. 8, each of the plurality of the first lead portions 121b or each of the plurality of the second lead portions 122b may have the upper surface of a lower height and the lower surface of a higher height.

For example, referring to FIGS. 3A to 4B together, the first internal electrode 121 may include the plurality of first lead portions 121b, and the first internal electrode 122 may include the plurality of second lead portions 122b. Each thickness of the plurality of first lead portions 121b in the z axis direction may be smaller toward one end of the capacitor body 110, and each thickness of the plurality of second lead portions 122b in the z axis direction may be smaller toward the other end of the capacitor body 110.

For another example, referring to FIGS. 5A and 5B together, the first internal electrode 121 may include the plurality of first lead portions 121b, the third lead portion 121c, and the fourth lead portion 121d, and the second internal electrode 122 may include the plurality of second lead portions 122*b*, the fifth lead portion 122*c*, and the sixth lead portion 122*d*.

Each thickness of the plurality of first lead portions 121*b* in the z axis direction may be smaller toward one end of the capacitor body 110, and each thickness of the plurality of second lead portions 122*b* in the z axis direction may be smaller toward the other end of the capacitor body 110.

Alternatively, each thickness of the plurality of first lead portions 121*b*, the third lead portion 121*c*, and the fourth lead portion 121*d* in the z axis direction may be smaller toward one end of the capacitor body 110, and each thickness of the plurality of second lead portions 122*b*, the fifth lead portion 122*c*, and the sixth lead portion 122*d* in the z axis direction may be smaller toward the other end of the capacitor body 110.

As described above, in the process of manufacturing the multilayered capacitor, the thickness of the portion where the first or second lead portion 121*b* or 122*b*, which corresponds to the cutting region, is in contact with the capacitor body 110 may be formed to be smaller than the thickness of the first or second capacitance forming portion 121*a* or 122*a*, thereby lowering the cutting stress, preventing the electrode breakage, improving the poor contact of the internal electrode with the external electrode, and improving the lower capacitance.

Although the embodiments of the present disclosure have been described, it is to be understood that the present disclosure is not limited to the disclosed embodiments. Various modifications may be made within the scopes of the claims, the description of the present disclosure and the accompanying drawings, which also fall within the scope of the present disclosure.

What is claimed is:

1. A multilayered capacitor comprising:
a capacitor body having first and second surfaces opposing each other in a first direction, third and fourth surfaces opposing each other in a second direction perpendicular to the first direction, and fifth and sixth surfaces opposing each other in a third direction perpendicular to the first and second directions, and including a plurality of dielectric layers and a first internal electrode and a second internal electrode alternately disposed in the first direction while having the dielectric layer interposed therebetween; and
a first external electrode and a second external electrode respectively disposed at both ends of the capacitor body in the second direction,
wherein the first internal electrode includes a first capacitance forming portion and a plurality of first lead portions extending from the first capacitance forming portion to the third surface of the capacitor body and connected to the first external electrode,
the second internal electrode includes a second capacitance forming portion overlapping the first capacitance forming portion in the first direction and a plurality of second lead portions extending from the second capacitance forming portion to the fourth surface of the capacitor body and connected to the second external electrode,
one of the plurality of first lead portions has edges inclined with respect the second direction such that a width in the third direction between the edges of the one of the plurality of first lead portions is smaller toward the first external electrode, and one of the plurality of second lead portions has edges inclined with respect the second direction such that a width in the third direction between the edges of the one of the plurality of second lead portions is smaller toward the second external electrode, and
a maximum distance, in the third direction, between outermost portions, that are in contact with the first external electrode, of the plurality of first lead portions is less than a width in the third direction of a central portion of the first internal electrode.

2. The capacitor of claim 1,
wherein for a thickness in the first direction, the one of the plurality of the first lead portions has a thickness smaller than a thickness of the first capacitance forming portion, and the one of the plurality of the second lead portions has a thickness smaller than a thickness of the second capacitance forming portion.

3. The capacitor of claim 2, wherein
the thickness of the one of the plurality of first lead portions is smaller toward one end of the capacitor body, and
the thickness of the one of the plurality of second lead portions is smaller toward the other end of the capacitor body.

4. The capacitor of claim 3, wherein
the one of the plurality of first lead portions and the one of the plurality of second lead portions each have an upper surface in the first direction of a height gradually lower in the first direction.

5. The capacitor of claim 3, wherein
the one of the plurality of first lead portions and the one of the plurality of second lead portions each have an upper surface inclined with respect to the first surface which is more than a lower surface thereof.

6. The capacitor of claim 1, wherein
the first or second internal electrode includes a sputtering layer.

7. The capacitor of claim 1, wherein
the plurality of the first lead portions and the plurality of the second lead portions respectively include two first lead portions and two second lead portions.

8. The capacitor of claim 1, wherein
the plurality of the first lead portions and the plurality of the second lead portions respectively include four first lead portions and four second lead portions.

* * * * *